Patented Mar. 7, 1944

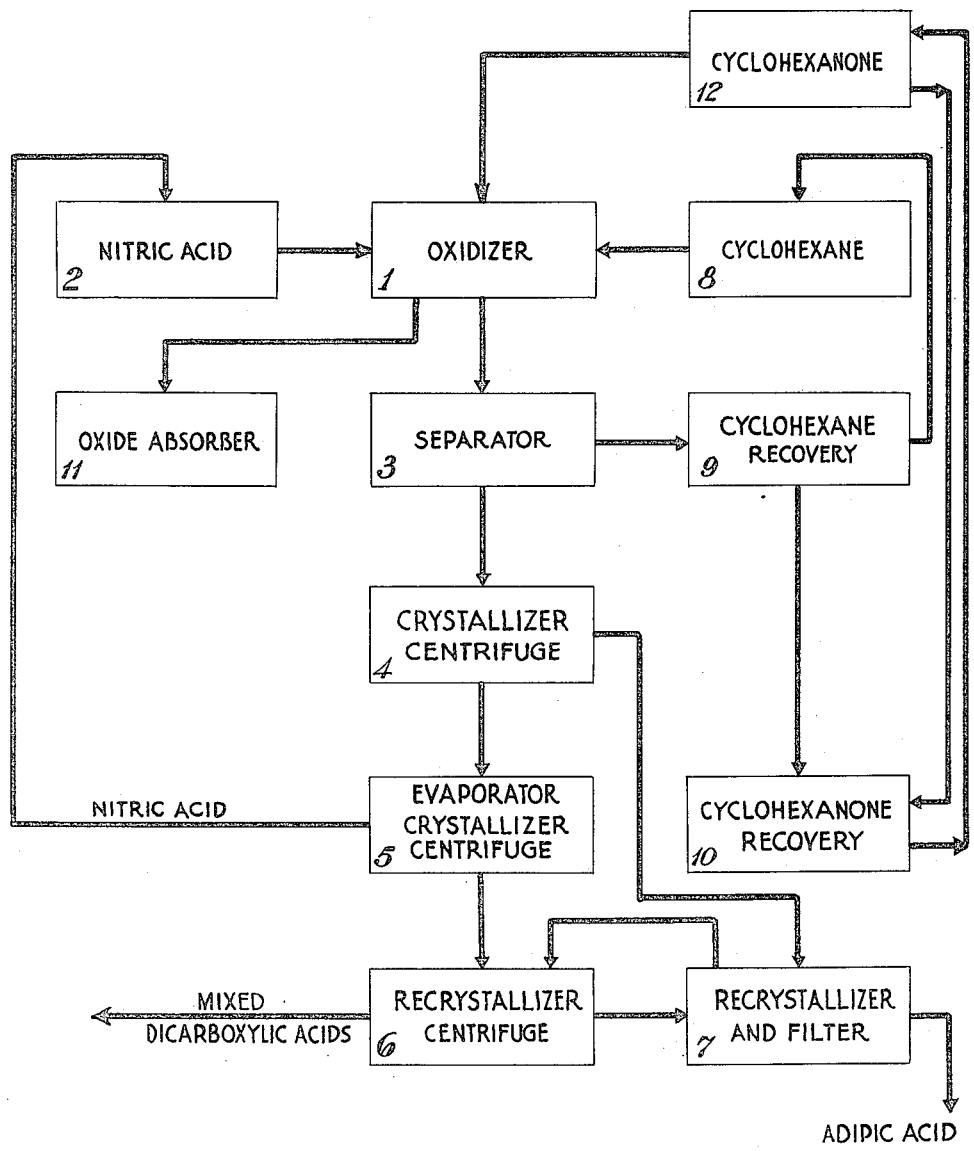

2,343,534

UNITED STATES PATENT OFFICE 2,343,534

PREPARATION OF ADIPIC ACID

Robert M. Cavanaugh and Wesley M. Nagle, Woodbury, N. J., assignor to E. I. du Pont de Nemours & Company, Wilmington, Del., a corporation of Delaware Application July 30, 1940, Serial No. 348,368

3 Claims. (Cl. 260—533)

This invention relates to a novel method for the simultaneous oxidation and nitration of cyclic aliphatic hydrocarbons and their alkyl derivatives, and more particularly to such a method for the preparation of adipic acid as one of the principal products from the oxidation of cyclohexane.

Methods have been disclosed heretofore wherein adipic and other dicarboxylic acids have been produced by oxidation of cyclic aliphatic hydrocarbons. While various oxidizing agents are adapted for carrying out such processes, nitric acid is one that possesses the double advantage of effectiveness and availability. The preparation of adipic acid by the reaction of cyclohexane with nitric acid is particularly attractive because of the importance of adipic acid as an organic intermediate and the availability of cyclohexane as a raw material. While the prior art has shown that adipic acid can be prepared by such a procedure, previous investigators have had little success practically, as the reaction has ordinarily been carried out in sealed tubes where there was no control or measurement of pressure. A method for the oxidation of cyclohexane to adipic acid which would lend itself to effective control and to satisfactory product yields would be a distinct advance.

The object of our invention is a new and improved method for the simultaneous oxidation and nitration of cyclo-paraffins and their derivatives. A further object is a method for the reaction of nitric acid with such hydrocarbons whereby improved yields of dicarboxylic acids are obtained. A further object is a method for the treatment of cyclohexane with nitric acid whereby adipic acid is obtained in satisfactory yields and where the other materials produced simultaneously are of industrial importance and of attractive yields. A still further object is a method for the preparation of adipic acid by the oxidation of cyclohexane and for the conversion of the nitration products into adipic acid. Additional objects will be disclosed as the invention is described further hereinafter.

We have found that the foregoing objects are accomplished by a method wherein a cyclo-paraffin hydrocarbon and nitric acid of a concentration between 30% and 90% HNO₃ are reacted to give oxidation and nitration products simultaneously. We carry out our oxidation and nitration process under controlled and elevated conditions of temperature and pressure and find that the operative range includes temperatures between 100° and 200° C. and pressures between 2 and 10 atmospheres. The maintenance of an initial content of nitrogen peroxide in the nitric acid favors the immediate acceleration of the reactions.

Our process is applicable to the treatment of various cyclo-paraffins and their alkyl derivatives, for example, cyclo-pentane, cyclohexane, cycloheptane, cyclo-octane, methyl cyclopentane, methyl cyclohexane, the dimethylcyclohexanes, dicyclohexyl, and the like. By the term "alkyl derivative," therefore, we intend to designate any cyclo-paraffin containing one or more radicals derived from a saturated hydrocarbon by removal of one hydrogen atom.

The preferred scope of our invention comprises the simultaneous oxidation and nitration of cyclohexane by nitric acid of the concentration stated and under the prescribed temperature and pressure ranges. As a result of the foregoing reaction, adipic acid is obtained as one product. This is the material principally desired, resulting from the oxidation of cyclohexane, and is obtained along with smaller amounts of other dicarboxylic acids, for example, succinic and glutaric acids. In addition to the above oxidation products, our process yields also considerable amounts of nitrocyclohexane as a nitration product. While nitrocyclohexane possesses some value in itself, we find it very important also because of the fact that it is readily converted to adipic acid by the introduction into the operations of a few additional steps. The ultimate yield of adipic acid is thereby considerably increased. Our process is in fact particularly attractive by reason of its adaptability to high yields of nitrocyclohexane with no sacrifice with regard to the amounts of adipic acid obtained directly.

The following examples will serve as specific embodiments of our invention, wherein exact conditions and details are described:

*Example 1*

Sixty-five grams of cyclohexane, 130 grams of 100% HNO₃, in the form of 62% acid, and 5 grams of NO₂ were mixed in a reaction vessel adapted to withstand pressure. The temperature was raised as rapidly as possible to approximately 135° C. The pressure was controlled by a suitable regulating device and the desired pressure of 50 pounds per square inch gauge pressure was reached in about one-half hour. The pressure was maintained at this value throughout the reaction. The apparatus was also connected to a condenser maintained at a temperature of 25° C., through which the non-condensible gases could escape from the reaction chamber without loss of condensible reactants. After the temperature had been maintained at approximately 135° C. for two hours, the apparatus was allowed to cool for one-half hour. While the reaction had not entirely ceased at this point, it had slowed down sufficiently to render continuance impracticable. Examination of the products showed them to comprise 32.8 grams of adipic acid and 35.6 grams of nitrocyclohexane, corresponding to theory yields based on cyclohexane of 29% and 36%, respectively.

*Example 2*

In Example 1, an embodiment is described in which simultaneous oxidation and nitration of cyclohexane was carried out, starting with new acid and making no attempt to utilize the excess or spent products of the reaction. The preferred method of operating in accordance with my invention converts the nitrocyclohexane ultimately into adipic acid and utilizes the excess reagents from one step of the process in a subsequent step. The present example describes such process, with reference to the scheme shown in Figure 1.

The spent acid from previous oxidations was utilized to make the oxidizing acid of the succeeding run. The residual acid comprised 51 grams of 53% $HNO_3$, containing also 14 grams of dissolved dicarboxylic acids. By the addition of new nitric, this acid was adjusted in tank 2 of Figure 1 to a composition comprising 214 grams of 58% $HNO_3$, and 5 grams of $NO_2$ was introduced into the acid mixture. The acid was run into reaction vessel 1, where it was intimately mixed with 65 grams of cyclohexane, coming from vessel 8. The mixture in the reaction vessel or oxidizer 1 contained nitric acid and cyclohexane in the ratio of 2.0 to 1.

The temperature of the contents of the oxidizer was raised rapidly to approximately 135–140° C. and this temperature was maintained for about two hours, the pressure being held constant at around 50 pounds per square inch. The gases evolved during the reaction were released and the NO and $NO_2$ absorbed in chamber 11. The nitrogen oxides recovered amounted to approximately 22 grams NO and 10 grams $NO_2$, corresponding to 60 grams $HNO_3$. After about two hours of heating, the oxidizer was allowed to cool. The liquid contents were transferred to chamber 3, where almost complete separation took place into a lower water layer and an upper oil layer. The oil or cyclohexane layer, comprising 44 grams by weight, was transferred to the recovery vessel 9. This oily portion comprised mainly nitrocyclohexane (17 grams) dissolved in cyclohexane (25 grams), and was treated with 52 grams of an approximately 15% caustic soda solution, whereby a water-soluble sodium salt of nitrocyclohexane was formed. The cyclohexane was then separated from the mixture to container 8, and the salt solution was transferred to vessel 10, which contained about 63.5 grams of approximately 13% $H_2SO_4$ solution. The cyclohexanone thus formed was then steam distilled and recovered in container 12, in the amount of about 11 grams, together with an aqueous solution of additional ketone. This latter solution was returned to vessel 10. The cyclohexanone was subsequently run into the oxidizer 1, where it was oxidized readily to adipic acid by means approximately 60% $HNO_3$. In carrying out this latter oxidation, it was found desirable to introduce an excess of cyclohexane as a diluent. The oxidation was at atmospheric pressure and at a temperature around 75–85° C., under which conditions the cyclohexane was substantially unaffected. The two-phase mixture from this operation was separated into aqueous and nonaqueous layers in 3, as before.

The combined water layers from separator 3 contained the dissolved adipic acid, and this was crystallized and centrifuged in 4. The filtrate from 4 was then evaporated in 5 and the concentrated mother liquor was crystallized and centrifuged. The final mother liquor contained approximately 51 grams of 53% $HNO_3$ containing 14 grams of dissolved residual acids, and was returned to vessel 2. The crystals from 5, and the mother liquor from a final purification of a previous run performed in 7 were combined and crystallized in 6. The crystals from 4 and 6 were dissolved, decolorized and recrystallized in 7. The total amount of adipic by the foregoing process comprised 18 grams directly from cyclohexane plus 13 grams from cyclohexanone, a total of 31 grams. In addition to the adipic acid, 12 grams of mixed dicarboxylic acids was recovered by evaporation of the mother liquor from 6. Known losses of cyclohexane during these operations totaled 8 grams. Twenty grams of nitric acid was recovered in distillates during concentration of aqueous solutions.

From the foregoing examples it is seen that our novel method brings about an efficiency of operation and a cycle of procedures wholly untaught in the prior art. While the range of acid concentration includes compositions containing from 30% to 90% $HNO_3$, we desirably use an initial acid containing between 45% and 75% $HNO_3$. Preferably, acid of around 60% $HNO_3$ content will be used. With such an acid and preferably with the maintenance of an initial $NO_2$ content in said acid between 0.1% and 5.0%, and a ratio of $HNO_3$ to cyclohexane between 0.75 and 3.0, the conditions are such as to produce a satisfactory yield of adipic acid and a relatively high yield of nitrocyclohexane. These two products separate readily on standing after the completion of the reaction, the adipic acid being present in solution in the lower layer, while the nitrocyclohexane remains dissolved in the unused cyclohexane of the upper layer. The adipic acid is readily separated by crystallization from the water layer, while other dicarboxylic acids in smaller amounts may be recovered in subsequent crystallizations, for example, glutaric and succinic acids.

For the recovery of the nitrocyclohexane as additional adipic acid, said nitrocompound in solution in cyclohexane is desirably treated with a dilute alkali solution whereby a water soluble salt of nitrocyclohexane is formed. The cyclohexane can then be returned for subsequent oxidation. The nitrocyclohexane solution, on the other hand, is treated with dilute sulfuric acid whereby cyclohexanone is formed. This latter compound may be separated from the salt solution by steam distillation and the cyclohexanone is then oxidized to adipic acid by treatment with nitric acid.

In the nitric acid oxidation of cyclohexanone to adipic acid, we do not wish to be limited as to the nitric acid concentration, although we prefer to use acid of the approximate strength of 60% $HNO_3$. In carrying out this oxidation, we find it desirable to operate ordinarily at atmospheric pressure or under vacuum, and in a temperature range of 40° to 100° C. To avoid any possibility of violent reaction, we preferably employ a diluent for the cyclohexanone in which the latter is dissolved. As such diluent, cyclohexane is very advantageous, although many other solvents for cyclohexanone may be used. Solvents which are compatible with the prevailing conditions and which are preferably not attacked by nitric acid under these conditions comprise, among others, various paraffin and cycloparaffin hydrocarbons, nitrated hydrocarbons, and chlorinated hydrocarbons. This oxidation of cyclohexanone, however, is described more fully in the co-pending application Serial Number 344,497, filed July 9, 1940, now matured into U. S. Patent 2,291,211, issued July 28, 1942.

In the foregoing disclosure of our invention, we have described its operation as a batch process wherein, however, there was almost complete return to the process of all products of any degree of utility. We may, however, operate both the cyclohexane and the cyclohexanone oxidations as continuous processes, and their adaptability to such methods of operation will be apparent.

One of the important improvements of the process has been the maintenance of an initial content of nitrogen peroxide in the nitric acid at the start of the operations. This $NO_2$ may be introduced in various ways, directly as the gas, by means of nitrous acid, or nitrites, or in any desired fashion. It should be understood therefore that there is no limitation on the method of introduction of the nitrogen peroxide.

The use of various catalysts is possible to promote the oxidation of cyclohexane, for example such materials as ammonium vanadate, iodine, boron trifluoride, and others. Such catalysts may be used desirably in the carrying out of the present invention in many cases.

We have described our invention at length in the foregoing. It will be understood, however, that many variations may be made in details of operation without departure from the scope of the invention. We intend to be limited only by the following patent claims.

We claim:

1. A method for simultaneous oxidation and nitration of cyclo-paraffin hydrocarbons and their alkyl derivatives, which process comprises reacting said materials and nitric acid at a temperature between 100° and 200° C. and at a controlled pressure between 2 and 10 atmospheres while maintaining the nitric acid concentration between 45% and 75% $HNO_3$.

2. A method for simultaneous oxidation and nitration of cyclo-paraffin hydrocarbons and their alkyl derivatives, which process comprises reacting said materials and nitric acid at a temperature between 100° and 200° C. and at a controlled pressure between 2 and 10 atmospheres while maintaining the nitric acid concentration between 45% and 75% $HNO_3$, and maintaining an initial content of nitrogen peroxide in the nitric acid.

3. A method for preparing adipic acid and nitrocyclohexane which comprises reacting cyclohexane and nitric acid at a temperature between 100° and 200° C. and at a controlled pressure between 2 and 10 atmospheres while utilizing nitric acid of a concentration between 45 and 75% $HNO_3$, separating aqueous and non-aqueous layers in the product, recovering a substantial portion of the adipic acid from the aqueous layer by crystallization, and recovering the nitrocyclohexane from the non-aqueous layer.

ROBERT M. CAVANAUGH.
WESLEY M. NAGLE.